(No Model.) 4 Sheets—Sheet 1.
C. W. THEIL.
STONE CUTTING MACHINE.
No. 578,429. Patented Mar. 9, 1897.
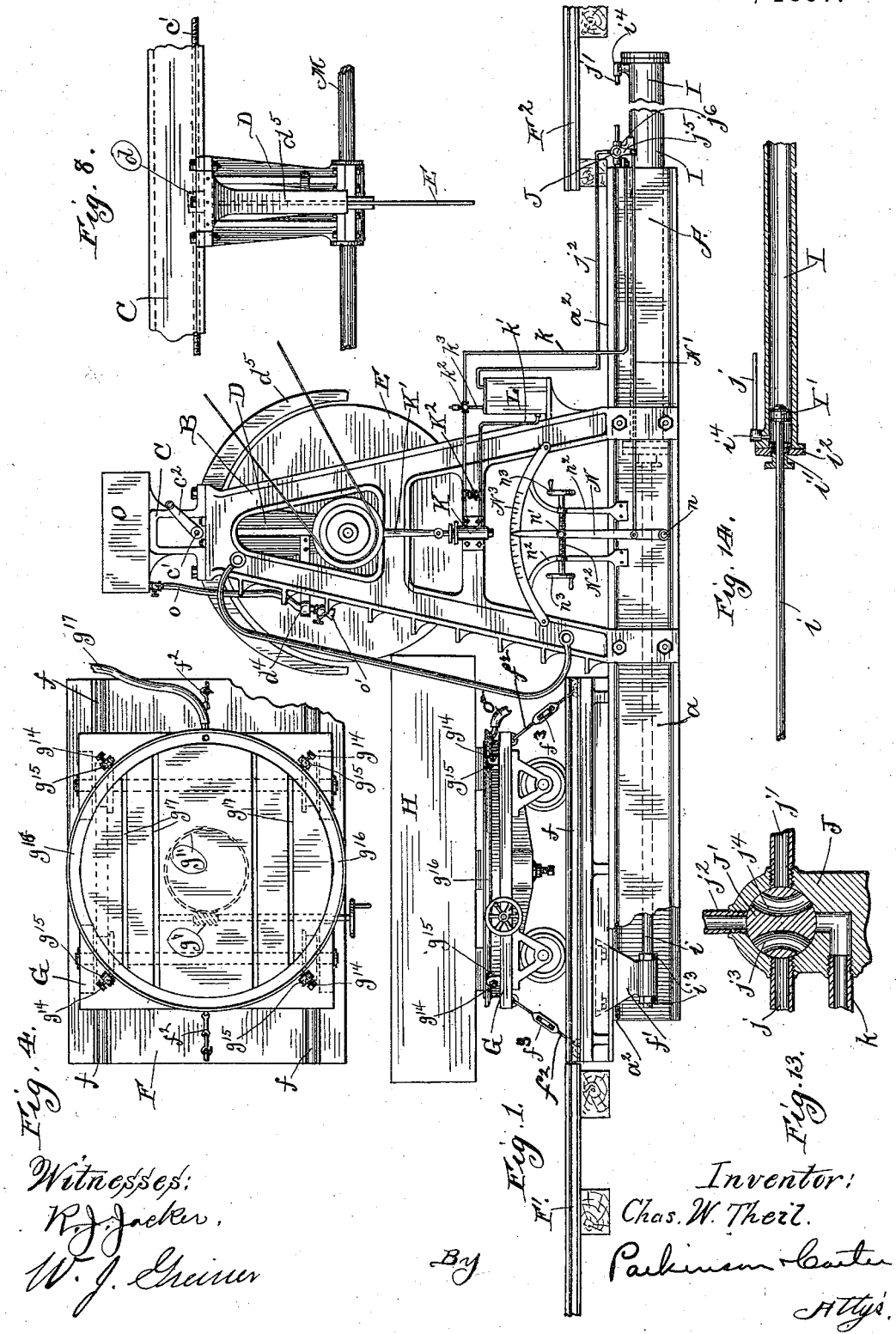
Witnesses:
R. J. Jacker,
W. J. Greiner
Inventor:
Chas. W. Theil.
By Parkinson & Carter
Attys.

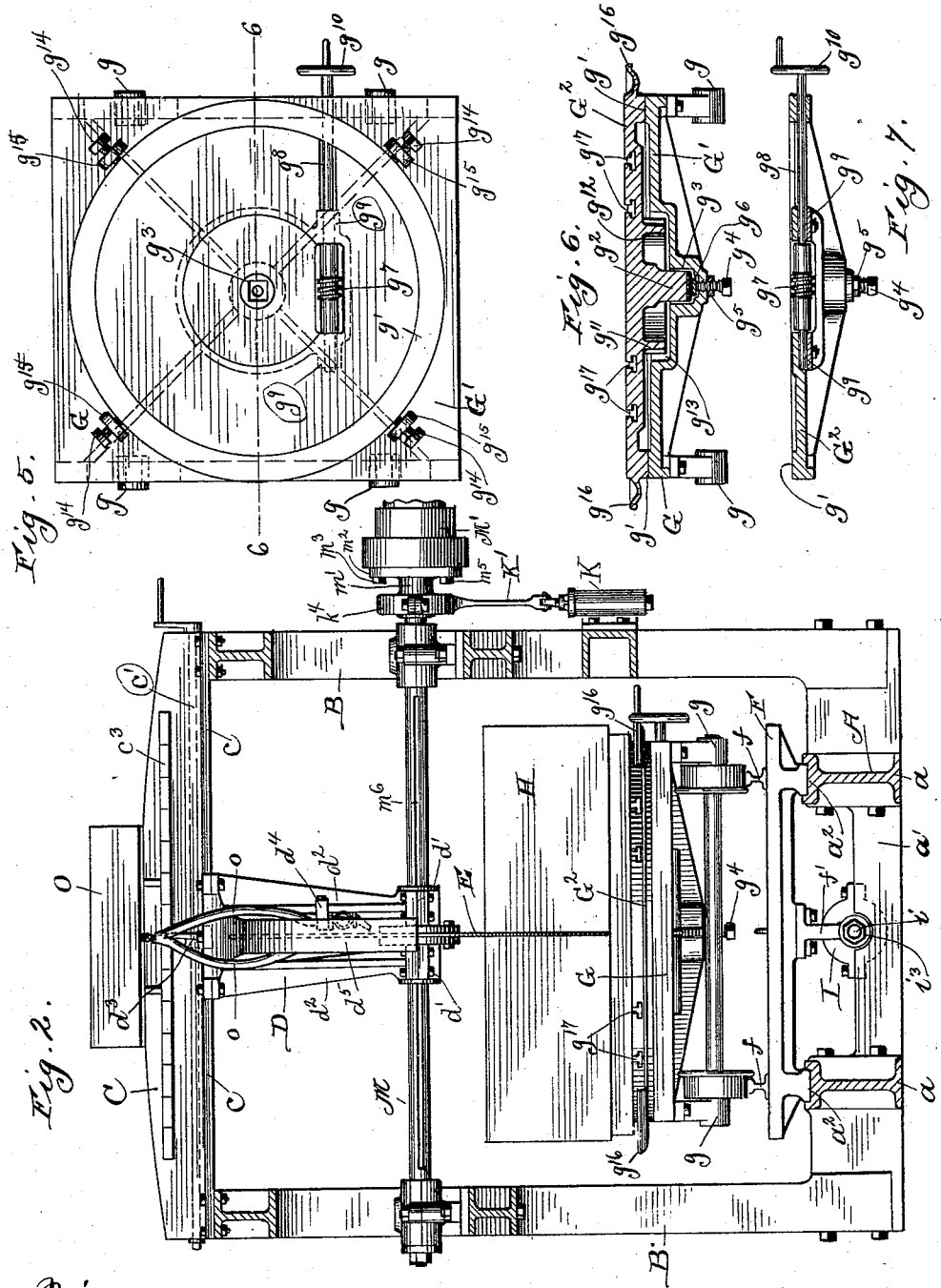

(No Model.)  
C. W. THEIL.  
STONE CUTTING MACHINE.  
No. 578,429. 4 Sheets—Sheet 3.  
Patented Mar. 9, 1897.
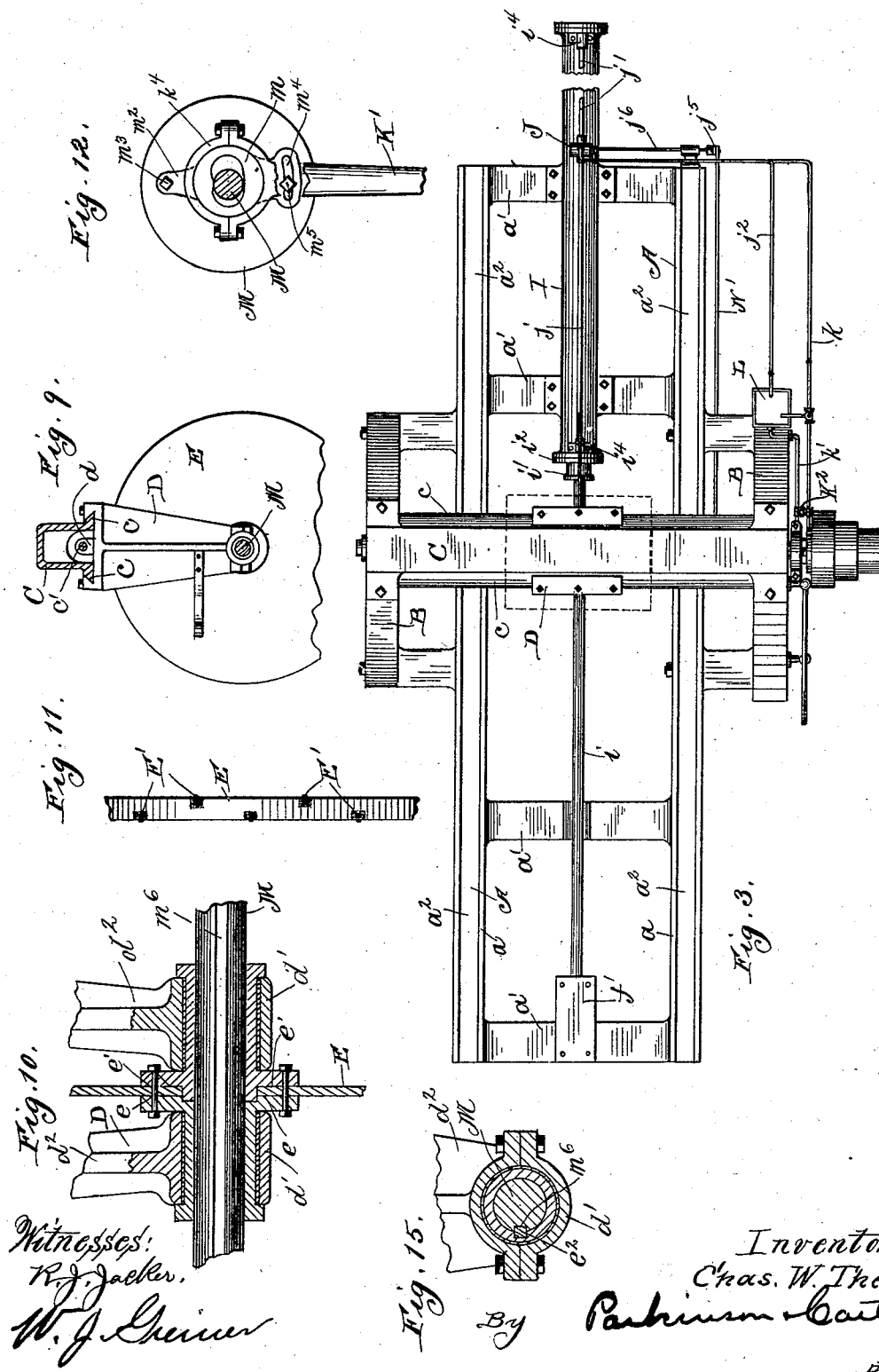
Witnesses:  
Inventor:  
Chas. W. Theil.  
By Parkinson & Carter  
Att'ys.

(No Model.) 4 Sheets—Sheet 4.
C. W. THEIL.
STONE CUTTING MACHINE.
No. 578,429. Patented Mar. 9, 1897.
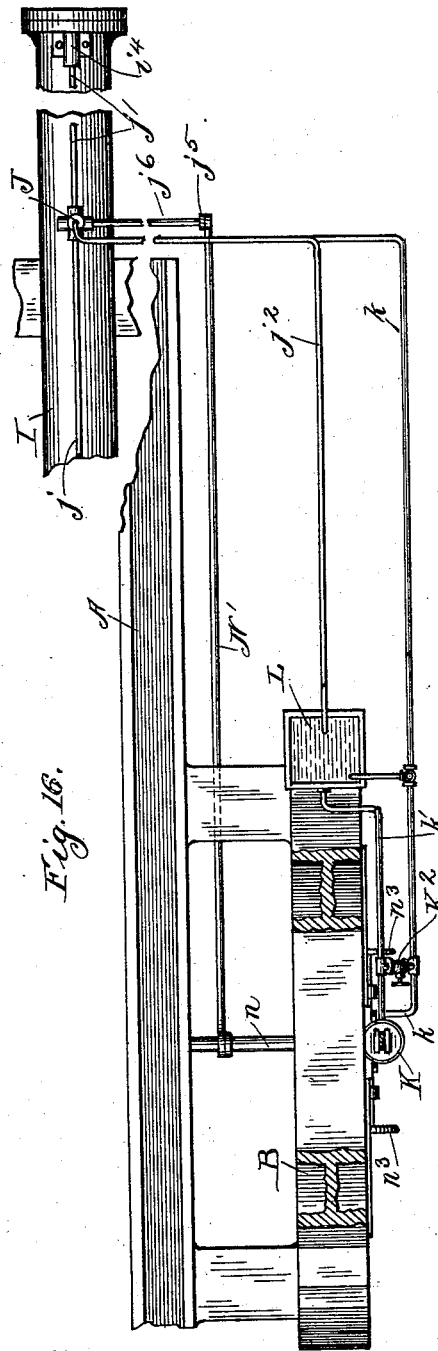
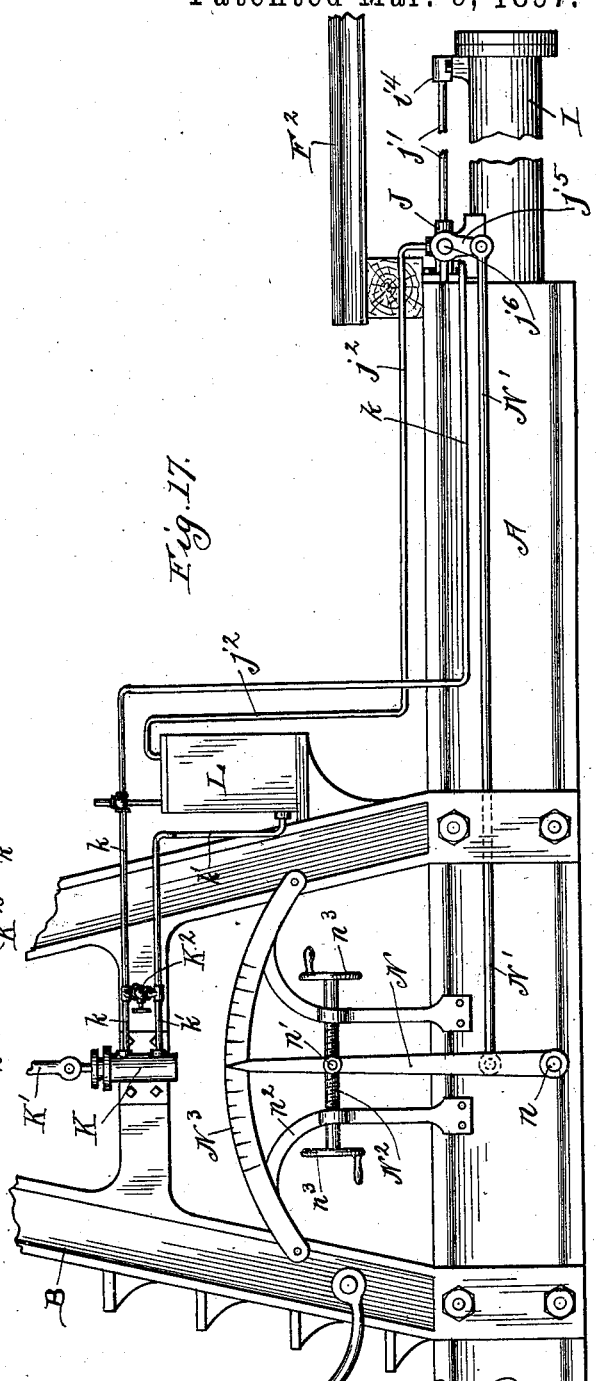

UNITED STATES PATENT OFFICE.

CHARLES W. THEIL, OF CHICAGO, ILLINOIS.

STONE-CUTTING MACHINE.

SPECIFICATION forming part of Letters Patent No. 578,429, dated March 9, 1897.

Application filed March 30, 1896. Serial No. 585,380. (No model.)

*To all whom it may concern:*

Be it known that I, CHARLES W. THEIL, of Chicago, in the county of Cook and State of Illinois, have invented certain new and useful Improvements in Stone-Sawing Machines, of which the following is a specification.

My invention relates to improvements in stone-sawing machines of that class in which a block of stone is placed upon a movable carriage and fed toward a rotary cutter which operates to divide the stone along the plane of its contact with the cutter.

The object of the invention is to provide an improved construction in machines of this character; and it consists of the matters hereinafter set forth, and more particularly pointed out in the appended claims.

In the accompanying drawings, Figure 1 is a side elevation of a complete machine constructed in accordance with my invention. Fig. 2 is a transverse sectional elevation thereof. Fig. 3 is a fragmentary top plan view of the machine with the platen removed. Fig. 4 is a top plan view of the platen and car. Fig. 5 is a top plan view of the car with the rotary bed-plate removed. Fig. 6 is a transverse sectional elevation of the car, taken on line 6 6 of Fig. 5, but showing the rotary bed-plate in place and running-gear removed. Fig. 7 is a transverse sectional elevation of the car-body, showing the worm-gearing by which the rotary bed-plate is turned. Fig. 8 is a detail front elevation of the rotary cutter and cross-head therefor. Fig. 9 is a fragmentary side elevation thereof. Fig. 10 is a longitudinal sectional detail showing the manner in which the cutter is revolubly mounted. Fig. 11 is a fragmentary edge view of a rotary cutter set with diamonds. Fig. 12 is a fragmentary detail showing the adjustable eccentric by which the stroke of the pump may be regulated. Fig. 13 is an enlarged sectional detail of the feed-controlling valve. Fig. 14 is a fragmentary longitudinal section of the feed-cylinder and piston. Fig. 15 is a detailed section on line 15 15 of Fig. 10. Fig. 16 is an enlarged detail in top plan view, and Fig. 17 a side elevation upon the same scale, of a portion of the machine, to more clearly represent the relief and by-pass valves and their relative arrangement to each other and to the pump.

In said drawings, A designates the bed of the machine, and B lateral standards which rise on either side of the bed A to support a transverse beam C, that carries a cross-head D, in which a rotary cutter E is revolubly mounted. The bed A comprises longitudinal side beams $a$, connected by transverse members $a'$ and provided on their upper surfaces with ways $a^2$, upon which a platen F is adapted to slide beneath the cross-head D and cutter E. The construction of this framework is generally similar to that of an ordinary metal-planer, and it will usually be made of cast-iron in convenient sections, suitably bolted or otherwise secured together. The reciprocating platen F is provided on its upper surface with longitudinally-arranged track-rails $f$, which are designed to register with stationary track-rails $F'$ $F^2$. The latter lead up to the opposite ends of the bed A and in such relation to the latter that the platen-rails will abut and be continuous with said stationary rails when the platen reaches the extreme limit of its movement in either direction.

G designates a car or truck designed to run upon the track-rails $f$ $F'$ $F^2$ and made of sufficient strength to withstand the weight of the largest block of stone, as H, which the machine is designed to operate upon. Said car or truck comprises a car-body G', having journal-bearings $g$ on its under side to receive the wheel-axles, and a rotary table $G^2$, that is pivoted centrally upon the car-body G' and upon which the stone H is placed. Said table $G^2$ is herein shown as sustained at its outer edge by coacting annular bearing surfaces or ways $g'$, and in the improved form shown is further supported at its center by a downwardly-projecting central pivot-stud $g^2$, which projects into a corresponding central pocket or recess $g^3$ in the car-body, and the under side of which is engaged by an adjustable bearing-screw $g^4$. The latter extends upwardly through the bottom of the pocket $g^3$ of the car-body and is provided with a jam-nut $g^5$, by which it may be locked in any desired position. An antifriction bearing plate or washer $g^6$ preferably covers the point of the screw $g^4$ and directly engages the under surface of the pivot-stud $g^2$. The adjustment of the screw $g^4$ will be ordinarily such as to receive and sustain the greater portion of the weight of the rotary table and of the block of stone placed upon it, so that said table may be revolved with comparative ease, while at the same time it is given a solid bearing and support by the annular surfaces or ways $g'$ at its outer margin.

Any suitable means may be provided for enabling the table to be readily rotated through any angle desired. In the approved form shown such rotation is accomplished by a worm $g^7$, provided on a horizontal shaft $g^8$, which is journaled in bearings $g^9$ of the car-body $G'$ beneath the table $G^2$. The shaft $g^8$ projects through the side of the car-body and is provided with a hand-wheel $g^{10}$, conveniently placed to be reached by the attendant. The worm $g^7$ intermeshes with a worm-gear $g^{11}$, which is formed on an annular flange $g^{12}$, that projects downwardly from the under side of the table $G^2$, being preferably cast integral therewith, into a suitable countersunk recess or pocket $g^{13}$ in the car-body.

Any suitable locking device may be used to prevent the table from being shifted from its desired position by an unintentional movement of the hand-wheel $g^{10}$ or by reason of the looseness or backlash which may exist between the worm and its gear. Such locking device consists in this instance of set-screws $g^{14}$, mounted in lugs $g^{15}$ at the corners of the car-body and the points of which are adapted to engage the outer periphery of the table $G^2$. Said table is further shown as provided around its edge with a flange or trough $g^{16}$ to catch the drip of the fluid which is supplied to ease the action of the rotary cutter on the stone, and the table is further herein shown as provided with undercut grooves $g^{17}$, adapted to receive the heads of the bolts which may be used to clamp the work upon the table.

An important feature of my present improvements consists in a hydraulic apparatus by which the platen F and car G are carried back and forth beneath the cutter E in the operation of the machine, such apparatus being herein shown as so constructed that the work will be fed toward the cutter by a succession of distinct movements which will occur in step with the successive rotations of the cutter, and the apparatus being furthermore so designed as to operate equally well in either direction, so that the stone may be sawed in both the forward and return movements of the platen.

I designates a hydraulic cylinder arranged longitudinally between the side beams $a$ of the bed, near one end thereof, and made equal in length to the desired travel of the platen. The piston-head $I'$ within said cylinder is connected with the platen F by a piston-rod $i$, which passes out through a stuffing-box $i'$ in the cylinder-head $i^2$, said piston-rod being herein shown as secured by nuts $i^3$ within an aperture in a downwardly-projecting bracket $f^7$ of said platen. The cylinder I is provided at its extreme opposite ends with ports $i^4$, from which pipes $j$ $j'$ lead to a four-way valve J. (Shown in detail in Fig. 13.) Said four-way valve is further connected with the discharge-pipe $k$ of a force-pump K, and an exhaust-pipe $j^2$ also leads from said four-way valve to a tank L, from which the pump receives its supply through a suction-pipe $k'$. A rotary plug $J'$ in the four-way valve is provided with two ports or passages $j^3$ $j^4$, which will connect the discharge-pipe $k$ of the pump with the cylinder-pipe $j$ and the exhaust-pipe $j^2$ with the cylinder-pipe $j'$, or vice versa, according to the position into which said plug is rotated.

The pump K is operated by an eccentric $m^2$ on the main shaft M, which drives the rotary cutter E, and is herein shown as bolted to the side of one of the lateral standards B of the machine directly beneath the shaft M and as connected with the eccentric $m$ by a pitman $K'$. The water discharged by the pump passes through the pipe $k$ to one end or the other of the cylinder I, according to the position of the four-way valve, and will operate upon the piston within the cylinder to move the platen accordingly, the exhaust from the other end of the cylinder passing out through the exhaust-pipe $j^2$ into the tank L, from which it is drawn by the pump through the suction-pipe $k'$ to be used over and over again.

The adjustment of the four-way valve J is controlled by a lever N, pivoted at $n$ to the bed A and connected by a rod $N'$ with a crank-arm $j^5$, which is rigidly attached to the stem $j^6$ of said valve. The upper end of the lever N is provided with a swivel-nut $n'$, through which passes an adjusting-screw $N^2$, that is revolubly mounted in suitable brackets $n^2$ on the bed. Hand-wheels $n^3$ are provided on the ends of the adjusting-screw $N^2$ and enable the latter to be turned so as to move the lever either to the right or left of its vertical position, and a suitably-graduated scale provided on a segment-bar $N^3$ adjacent to the upper end of the lever enables the amount of the movement of the latter to be gaged to a nicety.

The valve J will obviously be oscillated to admit water to one end or the other of the cylinder I, accordingly as the lever N is shifted to the right or left of the vertical, while a mid-position of the lever will entirely close the valve J and cut off all communication between the pump and cylinder. A relief-valve $k^2$, provided in the discharge-pipe $k$, is designed to open under any excessive pressure and permit the discharge from the pump to pass directly into the tank L through the relief-pipe $k^3$. Any dangerous or bursting pressure which might otherwise result from the continued operation of the pump after the lever N is swung into its mid-position is therefore obviated.

The velocity of the feed will depend upon the extent to which the valve J is opened by the lever N, and the pump K will ordinarily be made large enough to drive the platen at a considerably greater rate of speed than would usually be demanded for feeding the stone forward in the cutting operation, so that by opening the valve to its full extent the platen may be moved with great rapidity in any idle or return movement by which the work is brought into position for a renewed action of the cutter or by which the platen is simply moved from one position to another without a concurrent cutting operation. A slower movement at any desired rate of speed suitable for feeding the stone against the cutter will be secured by closing the valve J to a greater or less extent, according to the speed desired, and by opening a valved by-pass $K^2$, provided between the suction and discharge pipes of the pump, which will form an outlet for the excess of water that cannot pass into the cylinder by reason of the small opening of the valve J. Obviously any change in the opening of the valve J would result in a corresponding change in the speed of the platen even if the by-pass valve were undisturbed, and if the by-pass happened to be closed any excessive back pressure caused by a very small opening of the valve J would still be relieved through the valve $k^2$. On the other hand, a change in the adjustment of the by-pass valve would obviously result in a change in the working pressure, which would vary the feed independently of the valve J, but the construction in which both the valved by-pass and the controlling-valve J are present is deemed most advantageous.

As a further improvement the eccentric $m$ is made adjustable with relation to the shaft M, so as to enable the stroke of the pump to be varied as desired. To this end said eccentric $m$ is formed at the end of a sleeve $m'$, which is provided at its opposite end with a flange $m^2$. The latter is secured by a pivot-bolt $m^3$ to the face of the driving-pulley cone M' of the shaft M and is provided with an arc-shaped groove $m^4$, through which a clamping-bolt $m^5$ is passed. The aperture in said sleeve through which the shaft M passes is elongated laterally, so as to permit the sleeve to be shifted thereon when the bolt $m^5$ is loosened and the flange $m^2$ is swung upon its pivot $m^3$. Its eccentricity may thus be made greater or less, as desired, and it may then be clamped securely in place by tightening the bolt $m^5$. Obviously if the eccentric is swung into axial coincidence with the shaft M it will cease to operate as a cam and will merely rotate within the strap $k^4$ of the pitman $K'$, and in such case the pump would remain idle even though the shaft M continued to rotate indefinitely.

The cross-head D is designed to slide transversely upon ways formed by the lower lateral edges $c$ of the transverse beam C of the machine and is moved upon said ways by a transverse feed-screw $c'$, which is revolubly mounted lengthwise of the beam C and engages a threaded nut $d$ of the cross-head.

The beam C may be conveniently made in the form of a box-girder, open on its under side, as herein shown, and into which the nut $d$ of the cross-head projects from below, the screw-shaft being arranged longitudinally within the girder in position to pass through said nut. The manner of supporting the rotary cutter within the cross-head is shown in detail in Fig. 10, in which $d'$ designates journal-bearings provided at the lower ends of depending side arms $d^2$ of said cross-head. The cutter E is received between said arms $d^2$ of the cross-head and is herein shown as bolted between two interfitting sleeves $e\ e'$, that are mounted in the bearings $d'$. Said bearings $d'$ are arranged concentrically with the main driving-shaft M of the machine, and the sleeves $e\ e'$ are bored out to receive and fit over said shaft. The latter is provided in its length between the standards B with a longitudinal groove $m^6$, in which a suitable feather $e^2$ of the sleeves $e\ e'$ is adapted to slide. Obviously with this construction the cross-head D and cutter E may be shifted to any desired position between the standards B without disturbing the driving relation between the cutter and shaft. The thrust of the cutter, moreover, will be supported by the cross-head bearings independently of said shaft, and the latter may thus be made much lighter without danger of springing than would be the case if the cutter were mounted directly upon it. After the work has been passed once beneath the cutter the latter may be moved laterally any desired distance to make a succeeding cut by means of the transverse feed-shaft $c'$, upon one end of which an operating-handle $c^2$ is conveniently provided. The amount of the movement of the cross-head and cutter may be gaged by means of a scale $c^3$, which will be graduated as desired, and the indications of which may be read by a pointer $d^3$ on the cross-head. A tank Q is provided upon the cross-beam C above the cutter, and a flexible pipe or hose $o$ leads downwardly from the latter through a guide $d^4$ of the cross-head to direct a stream of water or other liquid from the tank upon the cutter. A flattened valved nozzle $o'$ is provided at the end of the pipe $o$ to distribute the water over the face of the cutter, and the centrifugal action will then immediately throw it to the cutting edge thereof. The water thus supplied will trickle downwardly over the stone and rotary table and will be collected in the peripheral flange or trough $q^{16}$ of the latter and be lead off through a flexible pipe $o^2$ to any suitable catch-basin or point of discharge. A shield $d^5$ on the cross-head practically incloses the cutter and prevents the water from being thrown off of its upper edge.

Any suitable form of circular or disk-shaped cutter may obviously be employed in this connection; but as a further improvement I have herein shown in detail in Fig. 11 a construction in which the cutter is composed of a circular disk of metal having diamonds E' or the like secured in suitable settings around its periphery. The disk itself in this case may be made of considerable width, so as to secure staggered relation along the opposite peripheral margins of the disk, so that the groove cut will be slightly wider than the disk and offer ample clearance for the passage of the same.

In the operation of the machine thus described a block of stone may be loaded upon the car or truck G at any suitable point in the yard or shop and run thence over the tracks F' F² upon the platen F of the machine. The car will then be secured upon said platen by suitable clamping devices, which in this instance consist of short tie-rods $f^2$, which hook into convenient eyes or staples on the car and platen and are provided with turnbuckles $f^3$, by which they may be tightened up. The cutter is then operated at a rate of speed suitable to the particular stone which is being operated upon, any desirable changes of speed being provided for by several different sizes of steps in the driving-cone M' of the main shaft. As soon as the cutter is set in motion the pump K will begin to force water into the cylinder I, the valve J being appropriately opened, and the block of stone will thereupon be gradually fed toward the cutter at a rate of speed corresponding with the rate of rotation of the latter, the rate of feed being additionally varied as desired by adjusting the valve J and by-pass K² after the manner before described. As the pump is operated by an eccentric upon the shaft which carries the rotary cutter its piston will make one operative stroke with each revolution of the cutter, thereby feeding the work one step toward the cutter for each such revolution. Obviously oil, glycerin, or other non-congealing liquid may be supplied to the pump instead of water and will be preferred wherever the machine is exposed to the weather and especially to low temperatures. When the entire block has been placed beneath and been divided by the cutter, the car may be released and run off upon the permanent tracks F' F² at the opposite end of the machine from which the car approached, and the platen may then be moved back to receive a succeeding block of stone upon another truck. To save the loss of time incident to such idle return of the platen, the next block, or it may be the same block receiving a subsequent cutting, may be fed against the cutter again in the opposite direction from the first movement. The direction of rotation of the cutter in such case may be reversed by any appropriate reversing mechanism (not shown) or it may remain the same as before, accordingly as deemed convenient or desirable. Succeeding cuts or divisions spaced at any desired distance apart may obviously be given to the block by running it back and forth beneath the cutter and moving the latter between the cuts the desired distance to the right or left by means of the feed-screw c, and the block may, furthermore, be transversely divided or divided upon any desirable angle by turning the rotary table G², upon which it rests.

I claim as my invention—

1. The combination with the frame, the cutter and the platen, of hydraulic devices for operating the platen, and means for controlling the inlet and discharge of said hydraulic devices, comprising a valve, a lever operatively connected with the valve-stem, a swiveling nut secured to said lever, an adjusting-screw passing through said nut and provided with a hand wheel or wheels, and a graduated scale over which the end of the lever passes.

2. The combination with the frame, cylinder and the platen and with hydraulic devices for moving said platen, of a pump for driving said hydraulic devices, and adjustable connections between the pump-plunger and driving-shaft, comprising a sleeve pivoted eccentrically to a rigid part on the shaft, a locking-bolt for securing said sleeve in different positions, a cam on the sleeve, and a pitman connecting said cam and plunger, the aperture in the sleeve through which the shaft passes being enlarged to permit a shifting of the sleeve to vary the eccentricity of the cam.

In witness that I claim the foregoing as my invention I hereunto set my hand this 27th day of March, 1896.

CHAS. W. THEIL.

Witnesses:
HENRY W. CARTER,
R. J. JACKER.